United States Patent [19]

Holmes et al.

[11] Patent Number: 5,500,273

[45] Date of Patent: Mar. 19, 1996

[54] ABRASIVE ARTICLES COMPRISING PRECISELY SHAPED PARTICLES

[75] Inventors: Gary L. Holmes, Vadnais Heights; Scott R. Culler, Burnsville, both of Minn.; David H. Hardy, New Richmond; William A. Hendrickson, St. Joseph, both of Wis.; Thomas P. Klun, Lakeland, Minn.; Kimberly K. Harmon; Robert V. Heiti, both of Hudson, Wis.; Kathryn M. Spurgeon, River Falls, Wis.; Charles J. Studiner, III, Oakdale, Minn.

[73] Assignee: Minnesota Mining and Manufacturing Company, St. Paul, Minn.

[21] Appl. No.: 445,364

[22] Filed: May 19, 1995

Related U.S. Application Data

[63] Continuation of Ser. No. 85,638, Jun. 30, 1993.

[51] Int. Cl.[6] .................................................. D06N 7/04
[52] U.S. Cl. ..................... 428/147; 428/283; 428/290; 51/295; 51/298; 51/309
[58] Field of Search .................................. 428/147, 283, 428/290; 51/295, 298, 309

[56] References Cited

U.S. PATENT DOCUMENTS

| | | | |
|---|---|---|---|
| Re. 29,808 | 10/1978 | Wagner | 51/401 |
| 1,910,444 | 5/1933 | Nicholson. | |
| 2,001,911 | 5/1935 | Wooddell et al. | 51/190 |
| 2,958,593 | 11/1960 | Hoover | 51/295 |
| 2,986,455 | 5/1961 | Sandmeyer | 51/296 |
| 3,041,156 | 6/1962 | Rowse et al. | 51/298 |
| 3,048,482 | 8/1962 | Hurst et al. | 51/298 |
| 3,481,723 | 12/1969 | Kistler et al. | 51/298 |
| 3,549,341 | 12/1970 | Kittredge et al. | 51/293 |
| 3,689,346 | 9/1972 | Rowland | 156/245 |
| 3,770,400 | 11/1973 | Hallewell et al. | 51/295 |
| 3,859,407 | 1/1975 | Blanding et al. | 264/62 |
| 3,982,359 | 9/1976 | Elbel et al. | 51/295 |
| 4,311,489 | 1/1982 | Kressner | 51/298 |
| 4,314,827 | 2/1982 | Leitheiser et al. | 51/298 |
| 4,318,766 | 3/1982 | Smith | 156/330 |
| 4,364,746 | 12/1982 | Bitzer et al. | 51/298 |
| 4,393,021 | 7/1983 | Eisenberg et al. | 264/143 |
| 4,623,364 | 11/1986 | Cottringer et al. | 51/309 |
| 4,652,274 | 3/1987 | Boettcher et al. | 51/298 |
| 4,652,275 | 3/1987 | Bloecher et al. | 51/298 |
| 4,701,288 | 10/1987 | Cook et al. | 264/14 |
| 4,735,632 | 4/1988 | Oxman et al. | 51/295 |
| 4,744,802 | 5/1988 | Schwabel | 51/309 |
| 4,751,138 | 6/1988 | Tumey et al. | 428/323 |
| 4,770,671 | 9/1988 | Monroe et al. | 51/293 |
| 4,773,920 | 9/1988 | Chasman et al. | 51/295 |
| 4,799,939 | 1/1989 | Bloecher et al. | 51/293 |
| 4,881,951 | 11/1989 | Wood et al. | 51/309 |
| 4,903,440 | 2/1990 | Larson et al. | 51/298 |
| 4,950,696 | 8/1990 | Palazzotto et al. | 522/25 |
| 4,952,612 | 8/1990 | Brown-Wesley et al. | 522/25 |
| 4,983,458 | 1/1991 | Dejaiffe | 428/402 |
| 4,985,340 | 1/1991 | Palazzotto et al. | 430/270 |
| 4,997,461 | 3/1991 | Markhoff-Matheny et al. | 51/295 |
| 5,009,675 | 4/1991 | Kunz et al. | 51/295 |
| 5,011,508 | 4/1991 | Wald et al. | 51/293 |
| 5,042,991 | 8/1991 | Kunz et al. | 51/295 |
| 5,090,968 | 2/1992 | Pellow | 51/293 |
| 5,147,900 | 9/1992 | Palazzotto et al. | 522/25 |
| 5,152,917 | 10/1992 | Pieper et al. | 51/295 |
| 5,201,916 | 4/1993 | Berg et al. | 51/293 |
| 5,213,591 | 5/1993 | Celikkaya et al. | 51/293 |
| 5,236,472 | 8/1993 | Kirk et al. | 51/292 |
| 5,435,816 | 7/1995 | Spurgeon et al. | 51/295 |

FOREIGN PATENT DOCUMENTS

| | | |
|---|---|---|
| 168065 | of 0000 | European Pat. Off.. |
| 0480133 | 4/1992 | European Pat. Off.. |
| 2354373 | 1/1978 | France. |
| 2507101 | 12/1982 | France. |
| WO92/15626 | 9/1992 | WIPO. |
| WO93/12911 | 7/1993 | WIPO. |
| WO94/19711 | 9/1994 | WIPO. |

OTHER PUBLICATIONS

Patent Abstracts of Japan JP 62–107954 vol. 11, No. 327 (M–635) Oct. 24, 1987.
*Encyclopedia of Polymer Science and Technology*, 8, John Wiley & Sons, Inc., 661 (1968).
Database WPI Derwent Publications Ltd. JP 92–170433 C21! Apr. 3, 1992.
Database WPI Derwent Publications Ltd. JP 92–369700 C45! Sep. 28, 1992.
Derwent Japanese Patent Reports Derwent Publications Ltd. AN 42665U Jul. 21, 1973.
Patent Abstracts of Japan JP 58–196974 vol. 8, No. 40 (M–278) Feb. 21, 1984.

*Primary Examiner*—Christopher W. Raimund
*Attorney, Agent, or Firm*—Gary L. Griswold; Walter N. Kirn; Paul W. Busse

[57] ABSTRACT

Abrasive articles comprising precisely shaped particles are disclosed. The particles are bonded together to form a shaped mass, e.g., a wheel; alternatively, the particles can be bonded to a backing to form a coated abrasive article; or the particles can be bonded into a fibrous, nonwoven substrate to form a non-woven abrasive article.

15 Claims, 4 Drawing Sheets

ABRASIVE ARTICLES COMPRISING PRECISELY SHAPED PARTICLES

This is a continuation of application Ser. No. 08/085,638 filed Jun. 30, 1993, pending.

BACKGROUND OF THE INVENTION

1. Field of the Invention

This invention relates to particulate material comprising a binder, and a method for making same. When the particulate material further contains abrasive grits, it can be used in bonded abrasives, coated abrasives, and nonwoven abrasives.

2. Discussion of the Art

Conventional coated abrasive articles typically consist of a layer of abrasive grits adhered to a backing. Generally only a small fraction of the abrasive grits in this layer are actually utilized during the useful life of the coated abrasive article. A large proportion of the abrasive grits in this layer are wasted. Furthermore, the backing, one of the more expensive components of the coated abrasive article, must also be disposed of before it has worn out.

Many attempts have been made to distribute the abrasive grits on the backing in such a manner so that a higher percentage of abrasive grits are actually utilized, thereby extending the useful life of the coated abrasive article. By extending the life of the coated abrasive article, fewer belt or disc changes are required, thereby saving time and reducing labor costs. Merely depositing a thick layer of abrasive grits on the backing will not solve the problem, because grits lying below the topmost grits are not likely to be used.

Several methods whereby abrasive grits can be distributed in a coated abrasive article in such a way as to prolong the life of the article are known. One such way involves incorporating abrasive agglomerates in the coated abrasive article. Abrasive agglomerates consist of abrasive grits bonded together by means of a binder to form a mass. The use of abrasive agglomerates having random shapes and sizes makes it difficult to predictably control the quantity of abrasive grits that come into contact with the surface of a workpiece. For this reason, it would be desirable to have an economical way to prepare precisely shaped abrasive agglomerates.

SUMMARY OF THE INVENTION

This invention provides precisely shaped particles and methods for making these particles. The particles comprise a binder. In one desirable embodiment, a plurality of abrasive grits is dispersed in the binder.

The method of this invention comprises the steps of:

(a) providing a production tool having a three-dimensional body which has at least one continuous surface, said surface containing at least one opening formed in said continuous surface, said at least one opening providing access to a cavity in said three-dimensional body;

(b) providing a dispensing means capable of introducing a binder precursor comprising a thermosetting resin into said at least one cavity through said at least one opening;

(c) providing a means, within a curing zone, for at least partially curing said binder precursor;

(d) introducing said binder precursor into at least a portion of said at least one cavity;

(e) continuously moving said at least one cavity through said curing zone to at least partially cure said binder precursor to provide a solidified, handleable binder having a shape corresponding to that portion of the cavity into which the binder precursor had been introduced;

(f) removing said binder from said at least one cavity; and (g) converting said binder to form a precisely shaped particle.

Steps (f) and (g) can be conducted simultaneously.

In a preferred embodiment, a plurality of abrasive grits is included with the binder precursor in step (d), and a binder containing abrasive grits is formed in step (e). The binder that contains abrasive grits is removed from the at least one cavity of the production tool in step (f). Materials other than abrasive grits can be included with the binder precursor.

The curing zone can contain a source of thermal energy, a source of radiation energy, or both. Suitable sources of radiation energy include electron beam, visible light, and ultraviolet light. In a variation of the general method, curing can be effected by thermal energy or by a combination of radiation energy and thermal energy.

In both the general and preferred embodiments, it is preferred that steps (d), (e), and (f) be carried out on a continuous basis or be carried out in a continuous manner. For these embodiments, it is preferred that the production tool be an endless web (belt), or a drum, preferably a cylindrical drum, which will rotate about its axis. Alternatively, a web having two ends can be used. Such a two-ended web travels from an unwind station to a rewind station. It is preferred that the production tool have a plurality of cavities.

During step (e) of the method, the binder precursor is solidified so as to be converted into a handleable binder.

The binder can be converted into particles by several means. In one means, when the binder is removed from the cavities of the production tool, it is released in the form of individual particles. These particles can contain additional materials or be free of additional materials. A typical material that can be included in these particles is abrasive grits. The resulting particles preferably have shapes that are essentially the same as the shapes of the cavities of the production tool. Thus, the particles have shapes that are determined by the shapes of the cavities of the production tool. In this first means, steps (f) and (g) are accomplished simultaneously, because the shaped particles have their characteristic form when they are released from the cavities of the production tool.

In a second means, the binder is removed from the major surface of the production tool in the form of a sheet comprising shaped portions that are of essentially of the same size and shape of the cavities of the production tool, but joined together by a relatively thin connecting layer of the material of the binder. In this second means, the sheet is then broken or crushed along the thin connecting layer of binder material to form the particulate material of this invention. The particles can be screened or classified to a desired size distribution. If the connecting layer of the binder material is carefully broken or crushed, the resulting particles can have shapes that are essentially the same as those of the cavities of the production tool.

It is also within the scope of this invention to use a carrier web to deliver binder precursor to the production tool. The binder precursor can be coated onto one major surface, e.g., the front surface, of a carrier web and then the resulting coated carrier web is brought into contact with the continuous surface of the production tool that contains the cavities. After at least partial curing, i.e. solidifying, of the binder precursor in the production tool, the binder, which preferentially adheres to the surface of the carrier web, is removed first from the production tool and then from the carrier web. Alternatively, the binder precursor is coated onto the continuous surface of the production tool having cavities, whereby such cavities are filled, and the carrier web is brought into contact with the continuous surface of the production tool containing the binder precursor in such a manner that the binder precursor contained in the cavities contacts the surface of the carrier web. After at least partial curing, i.e. solidifying, of the binder precursor, the binder adheres to the surface carrier web rather than to the production tool. The binder can then be removed from the carrier web. Subsequently, the precisely shaped particles are formed.

The precisely shaped particles can be modified by means of additives for use in abrading applications, either by themselves or as a component of an abrasive article. The particles of this invention can be used to prepare abrasive articles comprising a plurality of shaped particles, each of which comprises at least one abrasive grit and a binder, in which the binder is formed from a binder precursor comprising a thermosetting resin that can be cured by radiation energy or thermal energy or both. The particles can be bonded together to form a shaped mass, e.g., a wheel; alternatively, the particles can be bonded to a backing to form a coated abrasive article; or the particles can be bonded into a fibrous, nonwoven substrate to form a non-woven abrasive article.

This invention makes it possible to design particles suitable for specific applications by varying the shape and composition of the particles. The process of this invention provides a simple, fast, and economical method for manufacturing particles, especially abrasive particles having a precise shape. The process of this invention makes it possible to accurately make abrasive particles having the same dimensions from batch to batch, thereby leading to more consistent abrasive articles.

DETAILED DESCRIPTION OF THE INVENTION

As used herein, the expression "binder precursor" means any material that is conformable or can be made to be conformable by heat or pressure or both and that can be rendered non-conformable by means of radiation energy or thermal energy or both. As used herein, the expression "solidified, handleable binder" means a binder precursor that has been polymerized or cured to such a degree that it will not substantially flow or experience a substantial change in shape. The expression "solidified, handleable binder" does not mean that the binder precursor is always fully polymerized or cured, but that it is sufficiently polymerized or cured to allow removal thereof from the production tool while the production tool continues to move, without leading to substantial change in shape of the binder. After the binder is removed from the production tool, the binder can be exposed to an additional energy source to provide additional cure or polymerization of the binder. As used herein, the term "binder" is synonymous with the expression "solidified, handleable binder".

In one aspect, this invention involves a method of making a particulate material. In another aspect, this invention involves precisely shaped particles comprising a solidified, handleable binder. In still another aspect, this invention involves abrasive articles, such as bonded abrasive articles, coated abrasive articles, and nonwoven abrasive articles that comprise the precisely shaped particulate material of this invention.

Figure 1:
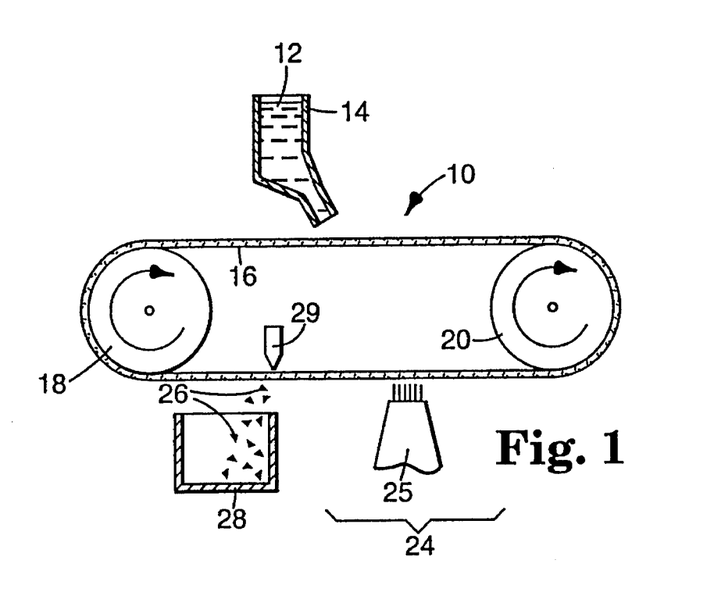
FIGS. 1, 2, and 3 are schematic side views illustrating various methods of carrying out the process of this invention.
Figure 6:
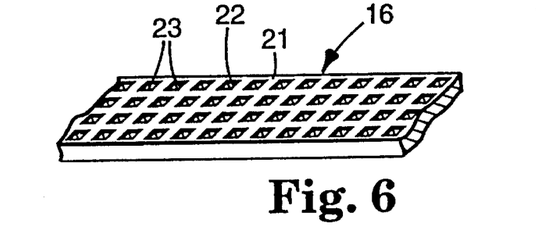
FIG. 6 is a perspective view of a segment of the production tool of FIG. 1. The segment illustrated in FIG. 6 is substantially similar to segments of the production tools of FIGS. 1, 2, and 3.

FIG. 1 illustrates an apparatus capable of carrying out the method of this invention to make the particles of this invention. In apparatus 10, binder precursor 12 is fed by gravity from a hopper 14 onto a production tool 16, which is in the form of an endless belt. The belt 16 travels over two rolls 18, 20, at least one of which is power driven. FIG. 6 is a perspective view of a segment of the production tool 16. As can be seen in FIG. 6, the production tool 16 is a three-dimensional body having a continuous surface 21 containing an opening 22 that provides access to a cavity 23 in the three-dimensional body. The binder precursor 12 fills at least a portion of cavity 23. The binder precursor 12 then travels through a curing zone 24 where it is exposed to an energy source 25 to at least partially cure the binder precursor 12 to form a solidified, handleable binder. Particles of precisely shaped binder material 26 are removed from the production tool 16 and collected in a container 28. External means 29, e.g., ultrasonic energy, can be used to help release the particles of binder material 26 from the production tool 16. Debris left in the production tool can be cleaned away before any fresh binder precursor is fed to the production tool.

Figure 2:
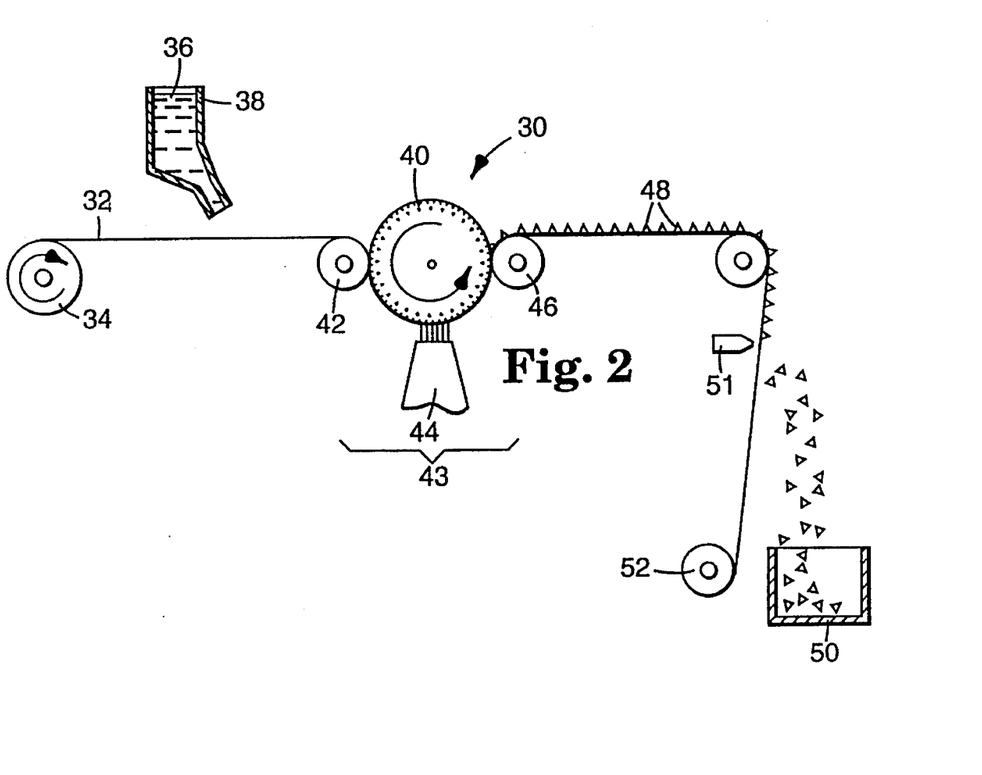

FIG. 2 illustrates another variation of apparatus capable of carrying out the method of this invention. Apparatus 30 comprises a carrier web 32 which is fed from an unwind station 34. Unwind station 34 is in the form of a roll. The carrier web 32 can be made of a material such as paper, cloth, polymeric film, nonwoven web, vulcanized fibre, combinations thereof and treated versions thereof. The preferred material for the carrier web 32 is a polymeric film, such as, for example, a polyester film. In FIG. 2, the carrier web 32 is transparent to radiation. A binder precursor 36 is fed by gravity from a hopper 38 onto a major surface of the carrier web 32. The major surface of the carrier web 32 containing the binder precursor 36 is forced against the surface of a production tool 40 by means of a nip roll 42. The surface of the production tool 40 that contacts the carrier web is curved, but it is otherwise identical to that of the segment of the production tool shown in FIG. 6. The nip roll 42 also aids in forcing the binder precursor 36 into the cavities of the production tool 40. The binder precursor 36 then travels through a curing zone 43 where it is exposed to an energy source 44 to at least partially cure the binder precursor 36 to form a solidified, handleable binder. Next, the carrier web 32 containing the solidified, handleable binder is passed over a nip roll 46. There must be sufficient adhesion between the carrier web 32 and the solidified, handleable binder in order to allow for subsequent removal of the binder from the cavities of the production tool 40. The particles of binder material 48 are removed from the carrier web 32 and collected in a container 50. External means 51, e.g., ultrasonic energy, can be used to help release the particles 48 from the carrier web 32. The carrier web 32 is then recovered at rewind station 52 so that it can be reused. Rewind station 52 is in the form of a roll.

Removal of the particles of binder material from the carrier web can be carried out efficiently by an alternative method. In this alternative, the carrier web can contain a thin, water-soluble layer on the major surface thereof that receives the binder precursor 36 from the hopper 38. The water-soluble layer will come into contact with the binder precursor 36. After the binder precursor 36 is at least partially cured, the combination of carrier web 32 and solidified, handleable binder is subjected to a source of water, whereby the water dissolves the water-soluble layer on the carrier web 32, thereby bringing about separation of the particles of binder material from the carrier web 32. An example of a water-soluble layer useful for this variation is a layer of a water-soluble polymer, e.g., polyvinyl alcohol, polyvinyl pyrrolidone, cellulose derivatives.

Figure 3:
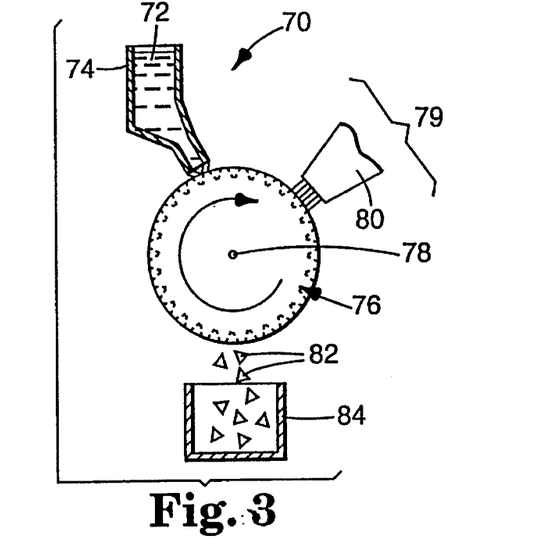

FIG. 3 illustrates another variation of an apparatus capable of carrying out the method of this invention. In apparatus 70, binder precursor 72 is knife coated from a hopper 74 onto a production tool 76. The production tool is in the form of a cylindrical drum and has an axis 78. The continuous surface of the production tool 76 is curved, but it is otherwise identical to the segment of the production tool shown in FIG. 6. As the production tool 76 rotates about the axis 78, the binder precursor 72 travels through a curing zone 79 where it is exposed to an energy source 80 to at least partially cure the binder precursor 72 to form a solidified, handleable binder. Next, the particles of solidified, handleable binder 82 resulting from the curing step of the process are removed from the production tool 76 and collected in a hopper 84. Removal is preferably carried out by mechanical means, e.g., a water jet. It is preferred that any debris remaining in the production tool 76 be removed before any fresh binder precursor is introduced. Debris removal can be accomplished by a brush, an air jet, or any other conventional technique. Although not shown in FIG. 3, additional means can be used to aid in removing the particles of binder from the production tool 76.

The production tool is a three-dimensional body having at least one continuous surface. The continuous surface contains at least one opening, preferably a plurality of openings, formed in the continuous surface. Each opening provides access to a cavity formed in the three-dimensional body. As used in this context, the term "continuous" means characterized by uninterrupted extension in space; the openings and cavities are features in the continuous surface, but they do not break the surface into a plurality of individual surfaces. The production tool can be in the form of a web, a belt, e.g., an endless belt, a sheet, a coating roll, or a sleeve mounted on a coating roll. It is preferred that the production tool be one that allows continuous operations, such as, for example, an endless belt or a cylindrical coating roll that rotates about an axis. Typically, a cylindrical coating roll is in the form of a right cylinder, has a diameter of from about 25 to about 45 cm, and is constructed of a rigid material. Apparatus utilizing a two-ended web can also be adapted to provide continuous operations. The preferred materials for a production tool are polymers, such as polyolefins, e.g., polypropylene, or metals, such as nickel. The production tool can also be formed from a ceramic material.

A production tool made of metal can be fabricated by engraving, photolithography, hobbing, etching, knurling, assembling a plurality of metal parts machined in the desired configuration, die punching, or other mechanical means, or by electroforming. The preferred method for preparing a metal production tool or master tool is diamond turning. These techniques are further described in the *Encyclopedia of Polymer Science and Technology*, Vol. 8, John Wiley & Sons, Inc. (1968), p. 651–665, and U.S. Pat. No. 3,689,346, col. 7, lines 30 to 55, both of which are incorporated by reference. The production tool may also contain a release coating to permit easier removal of the binder from the cavities and to minimize wear of the production tool. Examples of such release coatings include hard coatings such as metal carbides, metal nitrides, metal borides, diamond, or diamond-like carbon. It is also within the scope of this invention to use a heated production tool, which is preferably made from metal. A heated tool may allow easier processing, more rapid curing, easier release of the shaped particles from the tool.

In some instances, a polymeric production tool can be replicated from an original master tool. This is especially preferred when the production tool is in the form of a belt or web. One advantage of polymeric tools over metal tools is cost. Another advantage of polymeric tools is the capability of allowing radiation to pass from the radiation source through the production tool and into the binder precursor. A polymeric production tool can be prepared by coating a molten thermoplastic resin, such as polypropylene, onto the master tool. The molten resin can then be quenched to give a thermoplastic replica of the master tool. This polymeric replica can then be utilized as the production tool. Additionally, the surface of the production tool may contain a release coating, such as a silicone-based material or a fluorochemical-based material, to improve the releasability of the binder from the production tool. It is also within the scope of this invention to incorporate a release agent into the polymer from which the production tool is formed. Typical release agents include silicone-based materials and fluorochemical-based materials. It is within the scope of this invention to prepare production tools from polymers that exhibit good release characteristics. Such a polymer is described in WO 92-15626, published Sep. 17, 1992, incorporated herein by reference. That reference describes a fluorochemical graft copolymer comprising: a base polymer comprising polymerized units derived from monomers having terminal olefinic double bonds, having a moiety comprising a fluoroaliphatic group grafted thereto. The grafted fluoroaliphatic group is generally derived from a fluorochemical olefin comprising a fluoroaliphatic group and a polymerizable double bond.

The fluoroaliphatic group of the fluorochemical olefin is generally bonded to the polymerizable double bond through a linking group. Such fluorochemical olefins can be represented by the following formula:

wherein R represents hydrogen, trifluoromethyl, or straight-chain or branched-chain alkyl group containing 1 to 4 carbon atoms;

a represents an integer from 1 to 10;

b represents an integer from 1 to 6;

Q represents an (a+b)-valent linking group that does not substantially interfere with free radical polymerization; and $R_f$ represents a fluoroaliphatic group comprising a fully fluorinated terminal group containing at least seven fluorine atoms.

The metal master tool can be made by the same methods that can be used to make metal production tools. Other methods of preparing production tools are described in assignee's copending application Ser. No. 08/004,929, filed Jan. 14, 1993, now abandoned, incorporated herein by reference.

If the production tool is made from a thermoplastic material, the conditions of the method should be set such that .any heat generated in the curing zone does not adversely affect the production tool.

At least one continuous surface of the production tool contains at least one cavity, preferably a plurality of cavities. The solidified, handleable binder precursor will acquire a shape corresponding to the shape of the cavity. A cavity can have any geometric shape such as a pyramid, prism, cylinder, cone, or thin body having opposed polygonal faces. The geometric shapes can be truncated versions of the foregoing. It is also within the scope of this invention that a given production tool may contain a variety of cavities of different shapes or cavities of different sizes or both. In the case of a web or belt, the cavity can extend completely through the production tool. The cavities can abutt or have land areas between them. It is preferred that the sides of the cavities have a slope associated them to allow easier removal of the binder from the production tool.

Binder precursors suitable for this invention comprise a thermosetting resin that is capable of being cured by radiation energy or thermal energy. The binder precursor can polymerize via a condensation curing mechanism or an addition mechanism. The preferred binder precursors polymerize via an addition mechanism. The binder precursor can polymerize via a free radical mechanism or a cationic mechanism or both mechanisms. The binder precursor can be unfilled or can contain conventional filler material.

The binder precursor is preferably capable of being cured by radiation energy or thermal energy. Sources of radiation energy include electron beam energy, ultraviolet light, visible light, and laser light. If ultraviolet or visible light is utilized, a photoinitiator is preferably included in the mixture. Upon being exposed to ultraviolet or visible light, the photoinitiator generates a free radical source or a cationic source. This free radical source or cationic source then initiates the polymerization of the binder precursor. A photoinitiator is optional when a source of electron beam energy is utilized.

Examples of binder precursors that are capable of being cured by radiation energy include acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant acrylate group, vinyl ethers, epoxy resins, and combinations thereof. The term acrylate includes both acrylates and methacrylates.

Acrylated urethanes are diacrylate esters of hydroxy terminated isocyanate extended polyesters or polyethers. Examples of commercially available acrylated urethanes include "UVITHANE 782", available from Morton Thiokol Chemical, and "CMD 6600", "CMD 8400", and "CMD 8805", available from Radcure Specialties.

Acrylated epoxies are diacrylate esters of epoxy resins, such as the diacrylate esters of bisphenol A epoxy resin. Examples of commercially available acrylated epoxies include "CMD 3500", "CMD 3600", and "CMD 3700", available from Radcure Specialties Ethylenically unsaturated compounds include both monomeric and polymeric compounds that contain atoms of carbon, hydrogen and oxygen, and optionally, nitrogen and the halogens. Oxygen or nitrogen atoms or both are generally present in ether, ester, urethane, amide, and urea groups. Ethylenically unsaturated compounds preferably have a molecular weight of less than about 4,000 and are preferably esters resulting from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of acrylates include methyl methacrylate, ethyl methacrylate, ethylene glycol diacrylate, ethylene glycol methacrylate, hexanediol diacrylate, triethylene glycol diacrylate, trimethylolpropane triacrylate, glycerol triacrylate, pentaerythyitol triacrylate, pentaerythritol methacrylate, and pentaerythritol tetraacrylate. Other ethylenically unsaturated compounds include monoallyl, polyallyl, and polymethylallyl esters and amides of carboxylic acids, such as diallyl phthalate, diallyl adipate, and N,N-diallyladipamide. Still other ethylenically unsaturated compounds include styrene, divinyl benzene, and vinyl toluene. Other nitrogen-containing, ethylenically unsaturated compounds include tris(2-acryloyl-oxyethyl)isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

The aminoplast can be monomeric or oligomeric. The aminoplast resins have at least one pendant $\alpha,\beta$-unsaturated carbonyl group per molecule. These $\alpha,\beta$-unsaturated carbonyl groups can be acrylate, methacrylate, or acrylamide groups. Examples of such resins include N-hydroxymethylacrylamide, N,N'-oxydimethylenebisacrylamide, ortho and para acrylamidomethylated phenol, acrylamidomethylated phenolic novolac, and combinations thereof. These materials are further described in U.S. Pat. No. 4,903,440 and U.S. Ser. No. 07/659,752, filed Feb. 24, 1991, now U.S. Pat. No. 5,236,472 both of which are incorporated herein by reference.

Isocyanurate derivatives having at least one pendant acrylate group and isocyanate derivatives having at least one pendant acrylate group are further described in U.S. Pat. No. 4,652,274, incorporated herein by reference. The preferred isocyanurate material is a triacrylate of tris(hydroxy ethyl)isocyanurate.

Examples of vinyl ethers suitable for this invention include vinyl ether functionalized urethane oligomers, Commercially available from Allied Signal under the trade designations "VE 4010", "VE 4015", "VE 2010", "VE 2020", and "VE 4020".

Epoxies have an oxirane ring and are polymerized by the ring opening. Epoxy resins include monomeric epoxy resins and polymeric epoxy resins. These resins can vary greatly in the nature of their backbones and substituent groups. For example, the backbone may be of any type normally associated with epoxy resins and substituent groups thereon can be any group free of an active hydrogen atom that is reactive with an oxirane ring at room temperature. Representative examples of substituent groups for epoxy resins include halogens, ester groups, ether groups, sulfonate groups, siloxane groups, nitro groups, and phosphate groups. Examples of epoxy resins preferred for this invention include 2,2-bis [4-(2,3-epoxypropoxy)phenyl]propane (diglycidyl ether of bisphenol A) and materials under the trade designation "Epon 828", "Epon 1004" and "Epon 1001F", commercially available from Shell Chemical Co., "DER- 331", "DER- 332" and "DER-334", commercially available from Dow Chemical Co. Other suitable epoxy resins include glycidyl ethers of phenol formaldehyde novolac (e.g., "DEN-431" and "DEN-428", commercially available, from Dow Chemical Co.). The epoxy resins of the invention can polymerize via a cationic mechanism with the addition of an appropriate photoinitiator(s). These resins are further described in Smith, U.S. Pat. No. 4,318,766, and Tumey et al., U.S. Pat. No. 4,751,138, both of which are incorporated herein by reference.

Examples of photoinitiators that generate a free radical source when exposed to ultraviolet light include, but are not limited to, those selected from the group consisting of organic peroxides, azo compounds, quinones, benzophenones, nitroso compounds, acyl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Examples of photoinitiators that generate a free radical source when exposed to visible radiation are described in U.S. Pat. No. 4,735,632, incorporated herein by reference.

Cationic photoinitiators generate an acid source to initiate the polymerization of an epoxy resin or a urethane. Cationic photoinitiators can include a salt having an onium cation and a halogen-containing complex anion of a metal or metalloid. Other cationic photoinitiators include a salt having an organometallic complex cation and a halogen-containing complex anion of a metal or metalloid. These photoinitiators are further described in U.S. Pat. No. 4,751,138, incorporated by reference (col. 6, line 65 through col. 9, line 45). Another example is an organometallic salt and an onium salt described in U.S. Pat. No. 4,985,340 (col. 4, line 65 through col. 14, line 50); European Patent Applications 306,161; 306,162, all of which are incorporated by reference. Still other cationic photoinitiators include an ionic salt of an organometallic complex in which the metal is selected from the elements of Periodic Groups IVB, VB, VIB, VIIB, and VIIIB. This photoinitiator is described in European Patent Application 109,581, incorporated herein by reference.

In one particularly useful embodiment, the binder precursor may contain abrasive grits. The cured binder precursor, i.e., the binder, functions to bond the abrasive grits together to form a precisely shaped abrasive particle. The abrasive grits typically have an average particle size ranging from about 0.1 to 1500 micrometers, preferably from about 1 to about 1300 micrometers, more preferably from about 1 to about 500 micrometers, and most preferably from about 1 to about 150 micrometers. It is preferred that the abrasive grits have a Mohs' hardness of at least about 8, more preferably above 9. Examples of materials of such abrasive grits include fused aluminum oxide, ceramic aluminum oxide, white fused aluminum oxide, heat treated aluminum oxide, silica, silicon carbide, green silicon carbide, alumina zirconia, diamond, ceria, cubic boron nitride, garnet, tripoli, and combinations thereof. The ceramic aluminum oxide is preferably made according to a sol gel process, such as described in U.S. Pat. Nos. 4,314,827; 4,744,802; 4,623,364; 4,770,671; 4,881,951; 5,011,508; and 5,213,591, all of which are incorporated herein by reference. The ceramic abrasive grit comprises alpha alumina and, optionally, a metal oxide modifier, such as magnesia, zirconia, zinc oxide, nickel oxide, hafnia, yttria, silica, iron oxide, titania, lanthanum oxide, ceria, neodynium oxide, and combinations thereof. The ceramic aluminum oxide may also optionally comprise a nucleating agent, such as alpha alumina, iron oxide, iron oxide precursor, titania, chromia, or combinations thereof.

The ceramic aluminum oxide may also have a shape, such as that described in U.S. Pat. Nos. 5,201,916 and 5,090,968, both of which are incorporated herein by reference. The ceramic abrasive grits may also contain a surface coating.

The abrasive grit may also have a surface coating. A surface coating can improve the adhesion between the abrasive grit and the binder in the abrasive particle and/or can alter the abrading characteristics of the abrasive grit. Such surface coatings are described in U.S. Pat. Nos. 5,011,508; 1,910,444; 3,041,156; 5,009,675; 4,997,461; 5,213,591; and 5,042,991. An abrasive grit may also contain a coupling agent on its surface, such as a silane coupling agent.

The binder precursor can contain a single type of abrasive grit, two or more types of different abrasive grits, or at least one type of abrasive grit with at least one type of diluent material. Examples of materials for diluents include calcium carbonate, glass bubbles, glass beads, greystone, marble, gypsum, clay, $SiO_2$, $KBF_4$, $Na_2SiF_6$, cryolite, organic bubbles, organic beads, and the like.

The binder precursor for use in this invention can further comprise optional additives, such as, for example, fillers (including grinding aids), fibers, lubricants, wetting agents, surfactants, pigments, dyes, coupling agents, plasticizers, antistatic agents, and suspending agents. Examples of fillers suitable for this invention include wood pulp, vermiculite, and combinations thereof, metal carbonates, such as calcium carbonate, e.g., chalk, calcite, marl, travertine, marble, and limestone, calcium magnesium carbonate, sodium carbonate, magnesium carbonate; silica, such as amorphous silica, quartz, glass beads, glass bubbles, and glass fibers; silicates, such as talc, clays (montmorillonite), feldspar, mica, calcium silicate, calcium metasilicate, sodium aluminosilicate, sodium silicate; metal sulfates, such as calcium sulfate, barium sulfate, sodium sulfate, aluminum sodium sulfate, aluminum sulfate; gypsum; vermiculite; wood flour; aluminum trihydrate; metal oxides, such as calcium oxide (lime), aluminum oxide, titanium dioxide, and metal sulfites, such as calcium sulfite.

A grinding aid is defined as particulate material the addition of which to an abrasive article has a significant effect on the chemical and physical processes of abrading, thereby resulting in improved performance. In particular, it is believed that the grinding aid will (1) decrease the friction between the abrasive grits and the workpiece being abraded, (2) prevent the abrasive grits from "capping", i.e., prevent metal particles from becoming welded to the tops of the abrasive grits, (3) decrease the interface temperature between the abrasive grits and the workpiece, or (4) decrease the grinding forces. In general, the addition of a grinding aid increases the useful life of the coated abrasive article. Grinding aids encompass a wide variety of different materials and can be inorganic or organic. Examples of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this invention to use a combination of different grinding aids and, in some instances, this may produce a synergistic effect. The above-mentioned examples of grinding aids is meant to be a representative showing of grinding aids, and it is not meant to encompass all grinding aids.

Examples of coupling agents suitable for this invention include organo-silanes, zircoaluminates, and titanates. Examples of antistatic agents include graphite, carbon black, conductive polymers, humectants, vanadium oxide, and the like. The amounts of these materials can be adjusted to provide the properties desired. The binder precursor can optionally include water or an organic solvent.

If the particle contains abrasive grits, it is preferred that the particle be capable of breaking down during abrading. The selection and amount of the binder precursor, abrasive grits, and optional additives will influence the breakdown characteristics of the particle.

In order to form a mixture comprising a binder precursor and other materials, such as abrasive grits, the components can be mixed together by any conventional technique, such as, for example high shear mixing, air stirring, or tumbling. A vacuum can be used on the mixture during mixing to minimize entrapment of air.

The binder precursor can be introduced to the cavity of the production tool by a dispensing means that utilizes any conventional technique, such as, for example, gravity feeding, pumping, die coating, or vacuum drop die coating. The binder precursor can also be introduced to the cavities of the production tool by transfer via a carrier web. The binder precursor can be subjected to ultrasonic energy during the mixing step or immediately prior to the coating step in order to lower the viscosity of the binder precursor.

Although the binder precursor is only required to fill a portion of the cavity, the binder precursor preferably completely fills the cavity in the surface of the production tool, so that the resulting particulate material will contain few voids or imperfections. These imperfections cause the shape of the particulate material to depart from the desired precise shape. Additionally, when the precisely shaped binder material is removed from the production tool, an edge may break off, thereby creating an imperfection and detracting from the preciseness of the shape. It is preferred that care be taken throughout the process to minimize such imperfections. Sometimes, voids or imperfections are desirable, because they create porosity in the resultant particles, thereby causing the particles to have greater erodibility. It is also preferred that the binder precursor not extend substantially beyond the plane of the continuous surface of the production tool and not extend substantially beyond the openings of the cavities of the production tool.

It is sometimes preferred that the binder precursor be heated prior to being introduced to the production tool, typically at a temperature in the range of from about 40° to 90° C. When the binder precursor is heated, its viscosity is reduced with the result that it can flow more readily into the cavities of the production tool.

The step following the introduction of the binder precursor into the cavities of the production tool involves at least partially curing the binder precursor by exposing it to radiation energy or thermal energy while it is present in the cavities of the production tool. Alternatively, the binder precursor can be at least partially cured while it is present in the cavities of the production tool, and then post-cured after the binder is removed from the cavities of the production tool. The post-cure step can be omitted. The degree of cure is sufficient that the resulting solidified, handleable binder will retain its shape upon removal from the production tool.

Examples of sources of radiation energy for use in the curing zone include electron beam, ultraviolet light, visible light, and laser light. Electron beam radiation, which is also known as ionizing radiation, can be used at an energy level of about 0.1 to about 20 Mrad, preferably at an energy level of about 1 to about 10 Mrad. Ultraviolet radiation refers to non-particulate radiation having a wavelength within the range of about 200 to about 400 nanometers, preferably within the range of about 250 to 400 nanometers. The dosage of radiation can range from about 50 to about 1000 mJ/cm$^2$, preferably from about 100 mJ/cm$^2$ to about 400 mJ/cm$^2$. Examples of lamp sources that are suitable for providing this amount of dosage provide about 100 to about 600 watts/inch, preferably from about 300 to about 600 watts/inch. Visible radiation refers to non-particulate radiation having a wavelength within the range of about 400 to about 800 nanometers, preferably in the range of about 400 to about 550 nanometers. The amount of radiation energy needed to sufficiently cure the binder precursor depends upon factors such as the depth of the binder precursor while in the cavity, the chemical identity of the binder precursor, and the type of loading material, if any. Conditions for thermal cure range from a temperature of about 50° to about 200° C. and for a time of from fractions to thousands of minutes. The actual amount of heat required is greatly dependent on the chemistry of the binder precursor.

After being at least partially cured, the resulting solidified, handleable binder will preferably not strongly adhere to the surface of the production tool. In either case, at this point, the solidified binder precursor is removed from the production tool.

There are several alternative methods for removing the solidified, handleable binder i.e., the binder, from the production tool. In one method, the binder is transferred directly from the production tool to a collector, e.g., a hopper. In this method, if the production tool is made of a polymeric material, the binder can be removed from the cavities by ultrasonic energy, a vacuum, an air knife, or combinations thereof or other conventional mechanical means. If the production tool is made of metal, the binder can be removed from the cavities by means of a water jet or air jet. If the production tool has cavities that extend completely through the production tool, e.g., if the production tool is a belt having perforations extending completely therethrough, the binder can be removed by ultrasonic energy, mechanical force, water jet, air jet, or combinations thereof, or other mechanical means, regardless of the material of construction of the production tool.

In another method, the binder can be transferred indirectly from the production tool to a collector. In one embodiment, the binder can be transferred from the production tool to a smooth roll. The binder exhibits greater adhesion to the smooth roll than to the production tool. The transferred binder can then be removed from the smooth roll by means of skiving, vacuum, water jet, air jet, or other mechanical means. In one particular embodiment, the binder can be transferred from the production tool to a major surface of a carrier web. The binder exhibits greater adhesion to the major surface of the carrier web than to the production tool. The major surface of the carrier web to which the binder is transferred can bear a layer of material that is soluble in water or an organic solvent. The binder can easily be removed from the carrier web by merely dissolving the material that forms the soluble layer. In addition, mechanical means, e.g., skiving, vacuum, or ultrasound, can be used to remove the binder. Ultrasonic energy can be applied directly over a major surface of the web or off to a side of a major surface of the web. In another embodiment, the major surface of the carrier web can have a primer thereon. Examples of primers suitable for the, carrier web include ethylene acrylic acid copolymer, polyvinylidene chloride, crosslinked hexanediol diacrylate, aziridine materials, and the like. The binder will preferentially adhere to the primed carrier web. The binder can then be removed from the primed carrier web by mechanical means, e.g., skiving, vacuum, or ultrasound.

After the binder is removed from the production tool, either by direct or indirect means, it is then converted into particles. In one mode of conversion, the binder is released from the production tool in the form of particles. A given particle will have a shape that is essentially the shape of the portion of the cavity of the production tool in which the particle was at least partially cured. An advantage of this mode is that the particles are already of the proper grade or of the proper particle size distribution for subsequent use, e.g., incorporation into an abrasive article. In the conventional manner of making abrasive particles, e.g., agglomerates, the abrasive particles have to be crushed and then screened to obtain proper particle size distribution.

In a second mode of conversion, the binder is released from the production tool as a sheet of material comprising precisely shaped binder material interconnected by a thin layer of binder material. The binder is then broken or crushed along the thin interconnecting portions to form the particles of this invention.

In a variation, the production tool can be a drum or a belt that rotates about an axis. When the production tool rotates about an axis, the process can be conducted continuously. When the production tool is stationary, as in processes of the prior art, the process is conducted batch-wise. The continuous process of this invention is usually more efficient and economical than the batch-wise processes of the prior art.

This invention also provides abrasive articles containing abrasive particles made according to the process of this invention. These abrasive articles can be bonded abrasive articles, coated abrasive articles, or nonwoven abrasive articles. For a bonded abrasive article, the precisely shaped abrasive particles are bonded together by a bonding medium to form a shaped mass, e.g., a wheel, a cut-off wheel. Bonded abrasive articles are typically made by a molding process. For a coated abrasive article, the abrasive precisely shaped particles are bonded by a bonding medium to a backing. For a nonwoven abrasive article, the abrasive precisely shaped particles are,bonded by a bonding medium into a nonwoven fibrous substrate.

Figure 4:
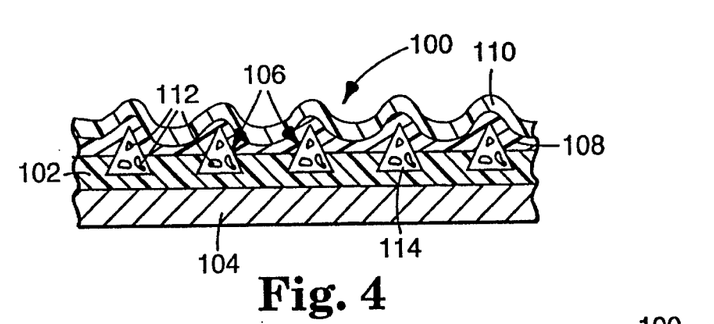
FIGS. 4 and 5 are schematic side views in elevation of a coated abrasive article that utilizes the particles of this invention.
Figure 5:
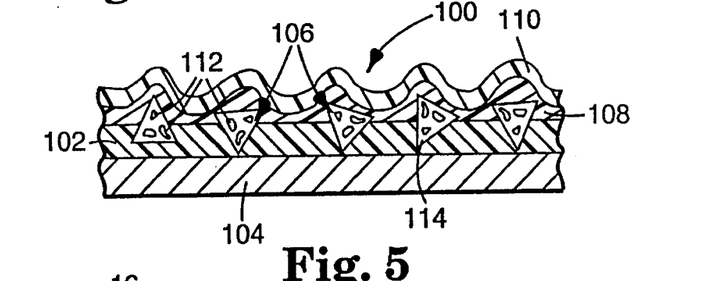

Backings suitable for preparing coated abrasive articles include polymeric film, primed polymeric film, cloth, paper, vulcanized fibre, polymeric foam, nonwovens, treated versions thereof, and combinations thereof. Referring to FIGS. 4 and 5, coated abrasive article 100 contains two coatings for binding the abrasive particles to the backing. Coating 102, commonly referred to as a make coat, is applied over backing 104 and bonds abrasive particles 106 to backing 104. Coating 108, commonly referred to as a size coat, is applied over abrasive particles 106 and reinforces abrasive particles 106. There may also be a third coating 110, commonly referred to as a supersize coat, applied over the size coat 108. As mentioned previously, the abrasive particles 106 comprise a plurality of abrasive grits 112 and a binder 114. The abrasive particles can be applied to the backing by conventional techniques, e.g., by drop coating or by electrostatic coating. Depending upon the coating method, the abrasive particles can either be oriented in a non-random manner as in FIG. 4 or oriented in a random manner as in FIG. 5.

The material for bonding the abrasive material to a substrate or together comprises a cured resinous adhesive and optional additives. Examples of resinous adhesives suitable for this invention include phenolic resins, aminoplast resins, urethane resins, epoxy resins, acrylate resins, acrylated isocyanurate resins, urea-formaldehyde resins, isocyanurate resins, acrylated urethane resins, vinyl ethers, acrylated epoxy resins, and combinations thereof. The optional additives include fillers (including grinding aids), fibers, lubricants, wetting agents, surfactants, pigments, dyes, coupling agents, plasticizers, and suspending agents. Examples of fillers include talc, calcium carbonate, calcium metasilicate, silica and combinations thereof. The amounts of these materials are selected to provide the properties desired.

A nonwoven abrasive article comprises an open, porous, fibrous, nonwoven substrate having a plurality of abrasive particles bonded into the substrate. This type of nonwoven abrasive article is described in U.S. Pat. No. 2,958,593.

The abrasive articles of this invention may further contain conventional abrasive agglomerates or individual abrasive grits or both. Conventional abrasive agglomerates are further described in U.S. Pat. Nos. 4,311,489; 4,652,275; and 4,799,939, incorporated herein by reference. Individual abrasive grits can also be selected to have a precise shape. Examples of individual abrasive grits include fused aluminum oxide, ceramic aluminum oxide, heat treated aluminum oxide, silicon carbide, alumina zirconia, diamond, ceria, cubic boron nitride, garnet, and combinations thereof. At least 10%, preferably at least 50%, and most preferably at least 70%, of the abrasive material should be the precisely shaped abrasive particles of this invention. In a coated abrasive article, the individual abrasive grits can be disposed over the precisely shaped abrasive particles. Alternatively, the individual abrasive grits can be disposed underneath the precisely shaped abrasive particles. The individual abrasive grit can be disposed between two precisely shaped abrasive particles.

Figure 7:
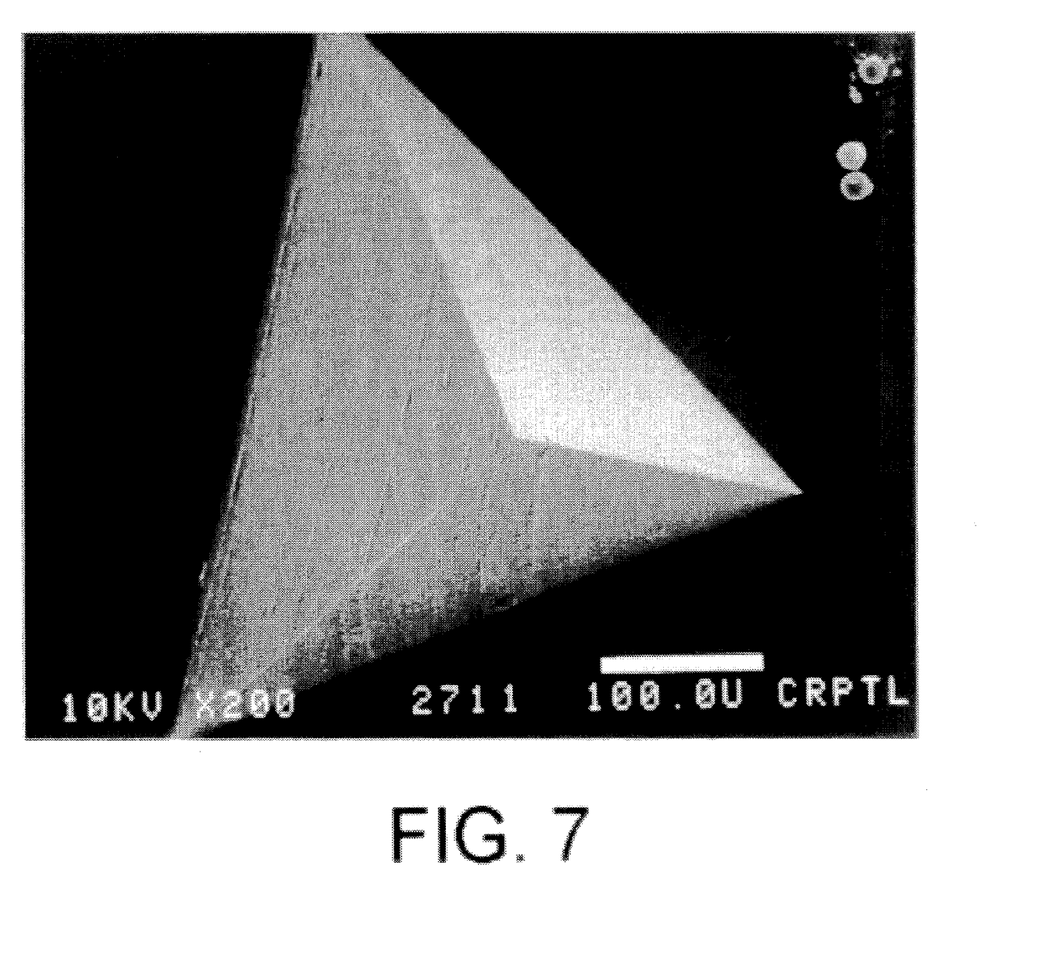
FIG. 7 is a Scanning Electron Photomicrograph of a shaped abrasive particle made according to the process of this invention. The particle has the shape of a triangular-based pyramid.

It is preferred that the precisely shaped particles have no dimension greater than 2500 micrometers. It is preferred that the size of the precisely shaped particles range from 0.1 to 1500 micrometers, more preferably from 0.1 to 500 micrometers. As indicated previously, the precise shape corresponds to portions of the surface of the production tool, e.g., cavities formed in the surface of the production tool. The particles of this invention have a precise shape. This precise shape is attributable to the binder precursor's being at least partially cured in the cavities of the production tool. There may, however, be minor imperfections in the particles that are introduced when the particles are removed from the cavities. If the binder precursor is not sufficiently cured in the cavities, the binder precursor will flow, and the resulting shape will not correspond to the shape of the cavities. This lack of correspondence gives an imprecise and irregular shape to the particle. This precise shape can be any geometrical shape, such as a cone, triangular prism, cylinder, pyramid, sphere, and a body having two opposed polygonal faces separated by a constant or varying distance, i.e., a polygonal platelet. Pyramids preferably have bases having three or four sides. The abrasive article may contain a variety of abrasive particles having different shapes. FIG. 7 is a scanning electron photomicrograph taken at about 300 magnification of an abrasive particle in the form of a pyramid having a triangular base.

The weight percentages of the abrasive grits and the binder in the precisely shaped particle will depend on several factors, such as the intended use of the abrasive article and the particle size and distribution of the abrasive grit. Typically, the percent by weight abrasive grits will range from about 5 to 95% and the percent by weight binder will range from about 95 to 5%. Preferably, the percentage, based on weight, of abrasive grits ranges from 20 to 75% and the percentage of binder ranges from 80 to 25%.

In another aspect of this invention, the precisely shaped particles do not contain any abrasive grits. These precisely shaped particles that are free of abrasive grits can be used in a coated abrasive article as a diluent particle. For example, a coated abrasive article may comprise a backing, and bonded to the backing are abrasive grits and precisely shaped particles that are free of abrasive grits. Alternatively, the coated abrasive article may comprise a backing, a first coat of cured resinous adhesive (make coat) applied over the front surface of the backing, abrasive grits and precisely shaped particles, wherein the grits and precisely shaped particles are secured to the backing by means of the make coat. Over the abrasive grits and precisely shaped particles is a second coat of cured resinous adhesive (size coat).

The precisely shaped abrasive particles can be coated or placed randomly onto the backing. Alternatively, the precisely shaped abrasive particles can be oriented on the backing in a specified direction. In the case of precisely shaped particles having the shapes of pyramids, cones, and prisms (e.g., triangular-shaped prisms), the particles can be oriented so that their bases point toward the backing and their vertexes point away from the backing, as in FIG. 4, or they can be oriented so that their vertexes point toward the backing and their bases point away from the backing, as do four of the particles in FIG. 5. With respect to pyramids and cones, the vertex referred to is the common vertex.

The coated abrasive article can be made according to the following procedure. A backing having a front surface and a back surface is provided. The front surface of the backing is coated with a first curable bonding medium comprising a resinous adhesive; then the precisely shaped abrasive particles and, optionally, the individual abrasive grits are coated or applied into the first curable bonding medium. The precisely shaped abrasive particles and optional abrasive grits can be drop coated or electrostatic coated. The first curable bonding medium is then solidified or cured to form a cured resinous adhesive. Optionally, a second curable bonding medium comprising a resinous adhesive can be applied over the precisely shaped abrasive particles and then solidified or cured to form a cured resinous adhesive. The second curable bonding medium can be applied prior to or subsequent to solidification or curing of the first curable bonding medium.

It is within the scope of this invention to provide a coating on the outer surface of the precisely shaped particle. The coating can be continuous or discontinuous. Examples of coatings suitable for the particles include metal coatings, metal oxide coatings, carbide coatings, nitride coatings, boride coatings, carbon coatings, diamond coatings, diamond like carbon coatings, and the like. Alternatively an organic coating can be present on the surface of the particle. The organic coating may also contain fillers, coupling agents, antistatic agents, grinding aids, and the like.

The selection and amount of the coating will depend upon the desired properties of the particle. For instance, some coatings will result in a retroreflective particle. Alternatively, some coatings will improve adhesion of the particle to other materials or a substrate.

The following non-limiting examples will further illustrate the invention. All parts, percentages, ratios, etc, in the examples are by weight unless indicated otherwise.

The following abbreviations and trade names are used throughout the examples.

TATHEIC triacrylate of tris(hydroxy ethyl) isocyanurate.
PH1 2,2-dimethoxy-1-2-diphenyl-1-ethanone, commercially available from Ciba Geigy Company under the trade designation "IRGACURE 651"
PH2 2-benzyl-2-N,N-dimethylamino-1-(4-morpolinophenyl)-1-butanone, commercially available from Ciba Geigy Company under the trade designation "IRGACURE 369"
WAO1 white aluminum oxide, 40 micrometer grade distribution
WAO2 white aluminum oxide, grade P-100
TMPTA trimethylol propane triacrylate
MSCA 3-methacryloxypropyl-trimethoxy silane coupling agent, commercially available from Union Carbide Corp. under the trade designation "A-174"
ASF amorphous silica particles having an average surface area of 50 $m^2/g$, commercially available from DeGussa Corp. (Richfield Part, N.J.), under the trade designation "OX-50"
PH3 neopentyl glycol propoxylate diacrylate, commercially available from Henkel Corp. (Ambler, Pa.), under the trade designation "Photomer 4127"
HMPP 2-hydroxy-2-methyl-1-phenyl-propan-1-one, commercially available from Ciba Geigy Company, under the trade designation "Darocur 1173"
IOA isooctyl acrylate, commercially available from CPS Chemicals (West Memphis, Ark.)
UDO aliphatic urethane diacrylate oligomer, diluted 15% with tripropylene glycol diacrylate, commercially available from Radcure Specialties, Inc. (Louisville, Ky.), under the trade designation "Ebecryl 4883"
ACU acrylate urethane containing 25% hexandiol diacrylate, commercially available from Cargill, Inc. (Minneapolis, Minn.), under the trade designation "15-1525"
APC hydrolyzed form of 3-(trimethoxysilyl)-propyl-methacrylate The abrasive particles were made according to one of the general procedures for preparing abrasive particles described below. Abrasive particles prepared by the methods of this invention were incorporated into a coated abrasive article according to the General Procedure For Making a Coated Abrasive Article described below. The abrasive articles were tested according to one of the test procedures described below.

General Procedure I for Preparing Abrasive Particles

A mixture containing TATHEIC (50 parts), TMPTA (50 parts), PH1 (2 parts), MSCA (0.5 part), and WAO1 (200 parts) having an average particle size 40 micrometers was coated onto the surface of a production tool having a pattern having cavities formed therein, which cavities can be characterized as being inverted pyramids. The tool was made of nickel and was essentially in the form of a sheet. The tool was made of nickel and was essentially in the form of a sheet. A sufficient amount of mixture was used to fill the cavities of the production tool. The pyramids of the pattern were disposed such that their bases were butted up against one another. The length of the base of the pyramid was about 530 micrometers and the height of the pyramid was about 530 micrometers. This type of pattern is illustrated in FIG. 1 of U.S. Pat. No. 5,152,917. Next, a polyester film (polyethylene terephthalate; 130 micrometers thick) was pressed against the production tool by means of a roller, and the mixture wetted the front surface of the polyester film. The front surface of the polyester film contained an ethylene acrylic acid prime coating having a thickness of about 20 micrometers. Then, ultraviolet light was transmitted through the polyester film and into the mixture to initiate polymerization of the binder precursor. The source of ultraviolet light consisted of two Aetek medium pressure mercury lamps, operating at 300 watts/inch. Next, the polyester film was separated from the production tool. The resulting abrasive particles, which preferentially adhered to the polyester film, were then removed from the polyester film by mechanical means. Then, the abrasive particles were forced through a 850 micrometer screen to separate abrasive particles that were adhered to one another, thereby forming individual abrasive particles.

General Procedure II for Preparing Abrasive Particles

General Procedure II was similar to General Procedure I with the following exceptions.

A binder precursor was prepared by mixing a composition consisting of 29.5 parts of a 50:50:1 mixture of TMPTA:TATHEIC:PH2 and 0.5 part of APC with 69 parts WAO1 and 1 part ASF. A bead of the binder precursor was poured onto the production tool, which was the same as that used in General Procedure I for preparing abrasive particles. The carrier web was placed primer side down on the binder precursor and production tool. A plastic blade was applied to the backside of the carrier web to squeeze the binder precursor into the cavities of the tool. The carrier web/ precursor/production tool construction was then taped to a metal platen, polyester side up, and was irradiated at a speed of about 3.1 meters/minute. The source of radiation energy was a 600 watt "V" bulb (available from Fusion Systems) on high setting. A nitrogen purge was used.

General Procedure for Preparing Coated Abrasive Articles for Comparative Examples Coated abrasive articles were made according to the teachings of U.S. Pat. No. 5,152,917, incorporated herein by reference. A mixture containing abrasive grits and binder precursor was coated onto a production tool. The production tool had cavities having the shape of inverted pyramids. The pyramids were disposed such that their bases were butted up against one another. The length of the pyramid base was about 530 micrometers and the height of the pyramid was about 530 micrometers. This type of pattern is illustrated in FIG. 1 of U.S. Pat. No. 5,152,917. The mixture was applied in a manner so as to fill the cavities. Next, a polyester film (80 micrometers thick) was pressed against the production tool by means of a roller, and the mixture wetted the front surface of the polyester film. The front surface of the polyester film contained an ethylene acrylic acid primer. Then ultraviolet light was transmitted through the polyester film and into the mixture to initiate polymerization of the binder precursor. The mixture was transformed into an abrasive composite. The source of ultraviolet light consisted of two Aetek medium pressure mercury lamps, operating at 300 watts/inch. Next, the polyester film/abrasive composite was separated from the tool to form an abrasive article. This process was a continuous process that was run at about 2.4 meters/minute. Next, the resulting abrasive article was laminated to vulcanized fibre (about 0.8 millimeter thick) by means of double stick tape.

General Procedure for Preparing Coated Abrasive Articles of this Invention (Disc)

The abrasive particles were incorporated into a coated abrasive disc having a backing made of vulcanized fibre. These fibre discs were individually made and had a diameter of 17.8 cm with a center hole having a diameter of 2.2 cm. The make coat was a conventional calcium carbonate filled phenolic resin (48% resin, 52% $CaCO_3$). The abrasive particles were electrostatically coated into the make coat. The size coat was also a conventional calcium carbonate filled phenolic resin (48% resin, 52% $CaCO_3$). The fibre discs were flexed prior to testing. The wet make coat weight was approximately four grams/disc and the wet size coat weight was approximately seven grams/disc.

General Procedure for Preparing Coated Abrasive Articles of this Invention (Belt)

The abrasive particles were incorporated into an endless coated abrasive belt having a spliceless backing as taught in U.S. Ser. No. 07/919,541, filed Jul. 24, 1992, now abandoned, incorporated herein by reference. The make coat was a conventional calcium carbonate filled phenolic resin (48% resin, 52% $CaCO_3$). The abrasive particles were drop coated onto the backing at a coating weight of 80 grains per 10 cm×15 cm sample. The size coat was also a conventional calcium carbonate filled phenolic resin (48% resin, 52% $CaCO_3$). The belts were flexed prior to testing.

Test Procedure I

The coated abrasive disc was first mounted on a beveled aluminum back-up pad and then used to grind the face of a 1.25 cm by 18 cm 1018 mild steel workpiece. The disc was driven at 5,500 rpm while the portion of the disc overlaying the beveled edge of the back-up pad contacted the workpiece at a load of about 4.5 kg. Each disc was used to grind a separate workpiece for one minute intervals for a total grinding time of five minutes. The amount of metal removed during each one minute interval was recorded.

Test Procedure II

Test Procedure II was the same as Test Procedure I, except for the following changes. The load was 300 grams; the test was ended when the workpiece began to burn, i.e., turn black or blue; and the grinding interval was 30 seconds. The initial cut for Test Procedure II was the amount of material removed after 30 seconds of grinding. The final cut for Test Procedure II was the amount of material removed in the last 30 seconds of grinding. The total cut is the sum of the cut throughout the test.

Test Procedure III

The coated abrasive article was converted into a 7.6 cm by 335 cm endless belt and tested on a constant load surface grinder. A pre-weighed 4150 mild steel workpiece, approximately 2.5 cm by 5 cm by 18 cm, was mounted in a holder. The workpiece was positioned vertically, with the 2.5 cm by 18 cm face facing an approximately 36 cm diameter serrated rubber contact wheel (85 Shore A durometer) with one-on-one lands over which was entrained the coated abrasive belt. The workpiece was reciprocated vertically through an 18 cm path at the rate of 20 cycles per minute, while a spring loaded plunger urged the workpiece against the belt with a load of about 6.8 kg as the belt was driven at about 2050 meters per minute. After one minute elapsed grinding time,

19 the workpiece holder assembly was removed and re-weighed, the amount of stock removed calculated by subtracting the weight after abrading from the original weight, and a new, pre-weighed workpiece and holder were mounted on the equipment. Approximately two belts were tested.

Example 1

Figure 8:
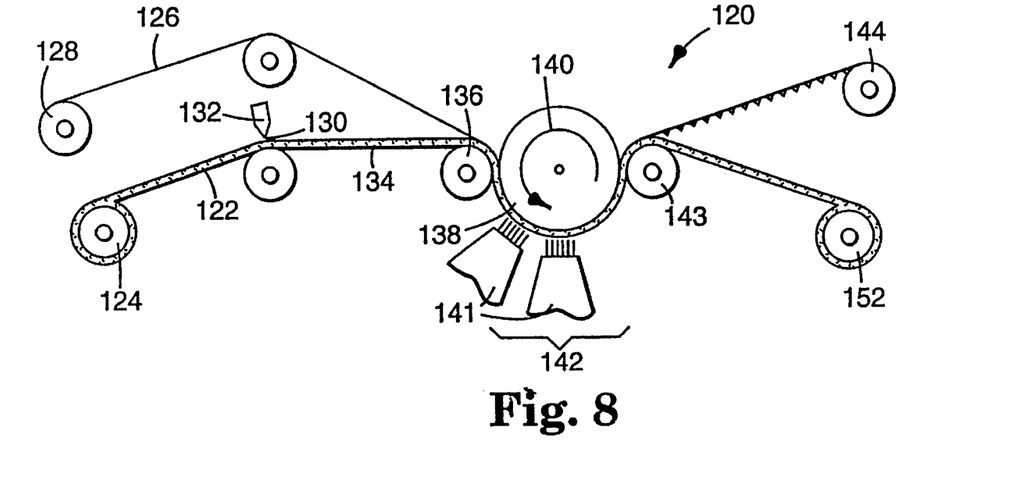
FIGS. 8 and 9 are schematic side views illustrating other methods of carrying out the process of this invention.

The particles for Example 1 were prepared on the apparatus illustrated in FIG. 8. Apparatus 120 comprises a production tool 122 in the form of web, which was fed from a first unwind station 124. Unwind station 124 was in the form of a roll. The production tool 122 was made of a polymeric material that was transparent to radiation. The production tool was made of a polymer having a polyethylene backbone and fluoroaliphatic groups attached thereto. This polymer is further described in WO 92-15626, published Sep. 17, 1990. The ethylene polymer was bonded to polyester and was characterized by a pattern of cavities in the form of pyramids having square bases and disposed such that the bases were butted up against each other. The height of the pyramid was about 500 micrometers and the length of each side of the base was about 900 micrometers. The surface of the production tool containing the cavities is similar to the segment of the production tool shown in FIG. 6. As the production tool 122 left the unwind station 124, a carrier web 126 left a second unwind station 128. The carrier web 126 was made of a polyvinyl alcohol coated paper, commercially available from Schoeller Technical Papers, Inc. of Pulaski, N.Y.; stock number 89-84-4. A binder precursor 130 was applied by means of a coater 132 into the cavities of the production tool 122. The binder precursor consisted of ACU (65 parts), PH3 (35 parts), HMPP (1 part). The portion of the production tool 134 containing the binder precursor was brought into contact with the carrier web 126 by means of a nip roll 136. The portion of the production tool 134 containing the binder precursor and the carrier web 126 was forced against a mandrel 138. The mandrel 138 rotated about an axis 140. Next, radiation energy from radiation source 141 in a curing zone 142 was transmitted through the production tool 122 and into the binder precursor. The source of radiation energy was a medium pressure mercury vapor ultraviolet lamp operating at 300 watts/inch (120 watts/cm). Upon exposure to the energy source, the binder precursor was converted into a solidified, handleable binder. Both the production tool containing the solidified, handleable binder and the carrier web were continuously moved through the curing zone 142 by means of the mandrel 138. The carrier web 126 was separated from the production tool containing the binder in the vicinity of a nip roll 143. The carrier web 126 was rewound on a rewind station 144.

The process was continuous and operated at a web speed of 3.1 meters/minute. After curing, the polyvinyl alcohol coated paper having particles bonded thereto was removed from the apparatus and the exposed faces of the particles were coated with aluminum by means of a cathodic arc. The thickness of the coating was 600 Angstroms. The polyvinyl alcohol layer was then stripped from the paper backing, dissolved in water (100° C.) with stirring for three minutes. The particles were then collected by vacuum filtration. The coated particles possessed the necessary mirrored retroreflection needed from low index materials to provide a greater angularity and function as good retroreflectors.

20

Example 2

Figure 9:
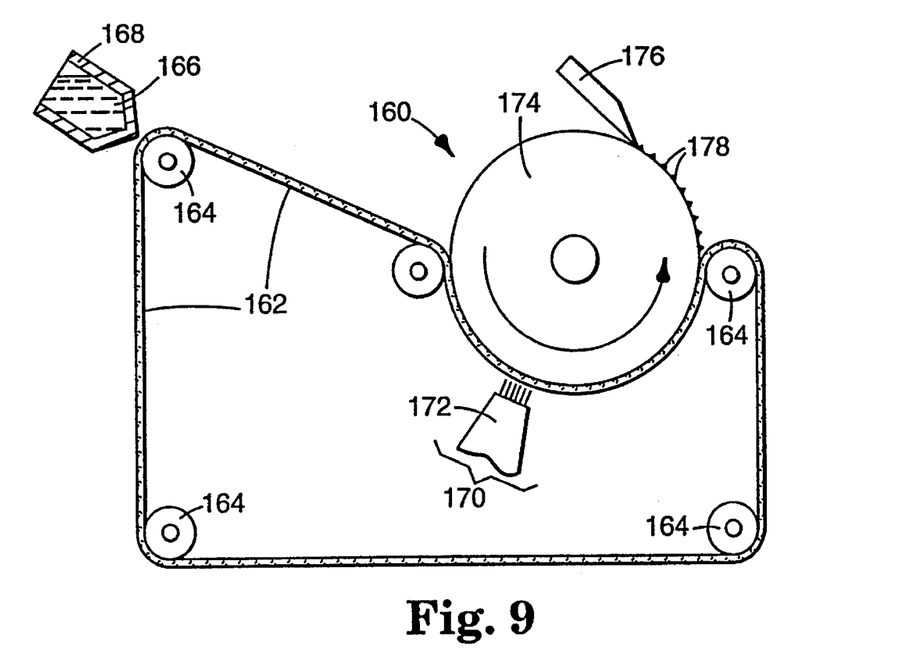

The particles for Example 2 were prepared on the apparatus illustrated in FIG. 9. Apparatus 160 comprised a production tool 162 in the form of an endless belt, which traversed a series of rollers 164, at least one of which was power-driven. The production tool 162 was made of the same material as was the production tool in Example 1 and was characterized by a pattern of pyramids having triangular bases and disposed such that the bases were butted up against each other. The height of the pyramid was about 75 micrometers and the length of each side of the base was about 125 micrometers. A binder precursor 166 was applied by means of a knife coater 168 into the cavities of the production tool 162.

The binder precursor consisted of UDO (67 parts), IOA (28 parts), MSCA (4 parts), and HMPP (1 part). The binder precursor 166 then traveled through a curing zone 170 where it was exposed to a source of radiation energy 172. The source of radiation energy was a medium pressure mercury vapor ultraviolet lamp operating at 300 watts/inch (120 watts/cm). The process was continuous and operated at a web speed of 0.6 meter/minute. Upon exposure to the energy source 172, the binder precursor 166 was converted into a solidified, handleable binder. The particles of binder 178 preferentially adhered to a smooth-surfaced roll 174. Immediately after leaving the curing zone 170, the particles 178 were removed from the smooth-surfaced roll 174 by a skiving means 176 and collected by means of vacuum (not shown). The particles 178 were then tumble vapor coated with silver by the following process. While the precisely shaped particles (8.0 g) were being tumbled in a vacuum chamber, they were sputter-coated with silver vapor from a sputtering target. The circular silver target (5 cm diameter and 0.4 cm thick) was attached to a Model 200 US' Gun from US, Inc. (Campbell, Calif.). The sputter gun was operated for 105 minutes in a direct current, planar magnetron mode at an applied power of 0.10 kilowatts, with a resulting cathode potential in the range of 476 to 502 volts. The argon sputtering gas pressure was approximately 6 millitorr and the background pressure was $8 \times 10^{-6}$ torr. The resulting precisely shaped particles were silver colored and had a bulk powder resistivity of 0.3 ohm-cm. The coated particles possessed a highly specular reflective coating, rendering them suitable for use in signage and reflective outerwear.

Examples 3–9

The particles in Example 3 were prepared according to General Procedure I for Preparing Abrasive Particles, with the exception that PH2 was used instead of PH1. The precisely shaped particles for Examples 3– 9 were removed from the carrier web by ultrasonic energy. More particularly, the backside of the carrier web was pulled, under tension, across the forward edge of an ultrasonic horn tapered to a single edge. The horn was oscillated at a frequency of 19,100 HZ at an amplitude of about 130 micrometers. The horn was composed of 6–4 titanium and was driven with a 900 watt 184 V Branson power source coupled with a 2:1 Booster 802 piezoelectric converter.

The following table sets forth the construction of the carrier web of each of Examples 3–9. The particles in Examples 4–9 were prepared according to General Procedure II for Preparing Abrasive Particles.

TABLE 1

| Example | Base of carrier web[1] | Thickness of base (μm) | Primer of carrier web[2] | Thickness of primer (μm) |
| --- | --- | --- | --- | --- |
| 3 | PET | 130 | EAA | 13 |
| 4 | PET | 100 | PVA | 13 |
| 5 | PET | 130 | EAA/PVA[3] | 20/13[3] |
| 6 | PET | 100 | PVDC | — |
| 7 | PET | 265 | HDDA | — |
| 8 | PET | 76 | Aziridine + sulfopolyester | — |
| 9 | PET | 76 | Aziridine | — |

[1]PET means polyethylene terephthalate
[2]EAA means ethylene acrylic acid; PVA means polyvinyl alcohol; PVDC means polyvinylidene chloride; HDDA means hexanediol diacrylate
[3]The primer consisted of an undercoat of EAA (20 μm) and a top coat of PVA (13 μm).

Table 2 sets forth the assessment of removal of the particles from the carrier web. Two procedural embodiments were tested: (1) directly running the film across the ultrasonic horn, and (2) heating the carrier web and composites at 115° C. for 10 minutes before running the film across the ultrasonic horn.

TABLE 2

| | Assessment of Removal | |
| --- | --- | --- |
| Example | Untreated Samples | Heated Samples |
| 3 | facile | difficult where EAA was melted and fixed composites to film |
| 4 | — | PVA removed from film with composites |
| 5 | — | facile |
| 6 | facile | facile |
| 7 | facile | facile |
| 8 | facile | film breaks |
| 9 | facile | facile |

Examples 10–13

Examples 10–13 demonstrate the use of water soluble primers for the removal of the particles from the carrier web.

Example 10

The particles for Example 10 were prepared according to General Procedure II for Preparing Abrasive Particles, with the exception that the production tool was a transparent silicone tool having the same topography as the nickel production tool. The binder precursor was cured through the transparent tool by means of a 600 watt "V" bulb (Fusion Systems) on "high setting" at a rate of 3.1 meters/minute. The carrier web was a release paper having a 13 micrometer thick coating of polyvinyl alcohol, available from Schoeller Technical Papers, Inc. After the binder precursor was cured, the sandwich construction was peeled apart. The carrier web with the solidified particles adhering thereto was placed under tap water, the particles were released from the backing, and the individual particles were recovered by mechanical processing.

Example 11

The particles for Example 11 were prepared according to General Procedure II for Preparing Abrasive Particles. A coated release liner as described in Example 10 was laminated to unprimed 100 micrometer polyester terephthalate film by a pair of heated nip rolls in a manner such that the polyvinyl alcohol coating was transferred from the release paper to the film. The primed film was used as the carrier web. After the binder precursor was cured, the sandwich construction was peeled apart. The carrier web with the solidified particles adhering thereto was placed under tap water, the particles were released from the backing, and the individual particles were recovered by mechanical processing.

Example 12

Example 11 was repeated, with the sole exception being that the unprimed polyethylene terephthalate film was 130 micrometers thick and had a polyvinylidene chloride prime coat.

Example 13

Example 12 was repeated, with the sole exception being that the polyethylene terephthalate film had been primed with ethylene acrylic acid (13 μm).

Example 14 and Comparative Examples A and B

The abrasive particles of Example 14 was made according to General Procedure I for Preparing Abrasive Particles. The coated abrasive article for Example 14 was prepared according to General Procedure for Preparing Coated Abrasive Articles of this Invention (Disc).

Comparative Example A employed a conventional lapping film (40 micrometer, 3M 268L Imperial Microfinishing Film, commercially available from Minnesota Mining and Manufacturing Company, St. Paul, Minn.). This coated abrasive article was laminated to a vulcanized fibre backing (0.8 millimeter thick).

Comparative Example B employed a conventional three-dimensional coated abrasive article (P400 Multicut XF cloth coated abrasive, commercially available from Minnesota Mining and Manufacturing Company, St. Paul, Minn.). This product contained conventional abrasive agglomerates made according to the teachings of U.S. Pat. No. 4,652,275. This coated abrasive article was laminated to a vulcanized fibre backing (0.8 millimeter thick).

The article of Example 14 was tested according to Test Procedure I and the test results are set forth in Table 3. The articles of Example 3 and Comparative Examples A and B were tested according to Test Procedure II, and the test results are set forth in Table 4.

TABLE 3

| Time (minutes) | Amount of metal removed (grams) |
| --- | --- |
| 1 | 7 |
| 2 | 6 |
| 3 | 6 |
| 4 | 5 |
| 5 | 5 |

TABLE 4

| Example | Initial cut (grams) | Final cut (grams) | Total cut (grams) |
| --- | --- | --- | --- |
| 14 | 1.7 | 1.0 | 27.2 |
| Comp. A | 1.7 | 0.3 | 2.9 |
| Comp. B | 1.5 | 0.3 | 8.4 |

Example 15 and Comparative Examples C and D

The abrasive article of Example 15 was made in the same manner as was the abrasive article of Example 14, except for the following changes. The abrasive grit was WAO2. Additionally, the length of the base of the pyramid and height of the pyramid was about 710 micrometers.

The abrasive article of Comparative Example C was a P100 Regal Resin Bond fibre disc, commercially available from Minnesota Mining and Manufacturing Company, St. Paul, Minn. This product contains conventional single ceramic aluminum oxide abrasive grains ("Cubitron", available from Minnesota Mining and Manufacturing Company) bonded to a vulcanized fibre backing.

The abrasive article of Comparative Example D was made according to the General Procedure for Preparing Coated Abrasive Articles for Comparative Examples. The mixture for preparing the abrasive particles for Comparative Example D was prepared by mixing together TATHEIC (50 parts), TMPTA (50 parts), PH1 (2 parts), and WAO2 (200 parts).

The abrasive articles from Example 15 and Comparative Examples C and D were tested according to Test Procedure II. The test was ended when the workpiece was burned. The test results are set forth in Table 5.

TABLE 5

| Example | Initial cut (grams) | Final cut (grams) | Total cut (grams) |
| --- | --- | --- | --- |
| 15 | 6.2 | 1.8 | 83 |
| Comp. C | 10.6 | 3.4 | 95 |
| Comp. D | 5.9 | 1.6 | 37 |

The coated abrasive article of Example 15 performed better than did the coated abrasive article of Comparative Example D and nearly as well as did the coated abrasive article of Comparative Example C.

Example 16 and Comparative Examples E and F

The abrasive article of Example 16 was made in the same manner as was the abrasive article of Example 14, except for the following changes. The photoinitiator used was PH2, and the length of the base of the pyramid and height of the pyramid was about 710 micrometers. Additionally, an endless coated abrasive belt was made according to General Procedure for Preparing Coated Abrasive Articles of this Invention (Belt).

The abrasive article of Comparative Example E was a P400 Regal Multicut Resin Bond belt, 3M 359F, commercially available from Minnesota Mining and Manufacturing Company, St. Paul, Minn. This product contained conventional ceramic aluminum oxide grain agglomerates ("Cubitron").

The abrasive articles from Example 16 and Comparative Example E were tested according to Test Procedure III. The test results are set forth in Table 6.

TABLE 6

| | Example 16 | | Comparative Example E | |
| --- | --- | --- | --- | --- |
| Time (min) | Cut (g) | Total cut (g) | Cut (g) | Total cut (g) |
| 1 | 1.82 | 1.82 | 3.06 | 3.06 |
| 2 | 3.46 | 5.28 | 5.66 | 8.72 |
| 3 | 4.47 | 9.75 | 6.66 | 15.38 |
| 4 | 4.39 | 14.14 | 7.16 | 22.54 |
| 5 | 4.97 | 19.11 | 7.19 | 29.73 |
| 6 | 5.45 | 24.56 | 7.75 | 37.48 |
| 7 | 6.48 | 31.03 | 8.55 | 46.03 |
| 8 | 6.43 | 37.46 | 8.36 | 54.39 |
| 9 | 6.33 | 43.78 | 8.05 | 62.44 |
| 10 | 6.98 | 50.76 | 6.74 | 69.18 |
| 11 | 7.53 | 58.29 | 6.05 | 75.23 |
| 12 | 8.38 | 66.67 | 4.13 | 79.36 |
| 13 | 8.65 | 75.32 | 2.67 | 82.03 |
| 14 | 8.22 | 83.54 | 2.15 | 84.18 |
| 15 | 7.39 | 90.94 | 1.88 | 86.06 |
| 16 | 8.51 | 99.45 | 1.76 | 87.82 |
| 17 | 8.88 | 108.32 | 0.94 | 88.76 |
| 18 | 8.74 | 117.05 | 0.65 | 89.41 |
| 19 | 8.88 | 125.94 | 1.09 | 90.50 |
| 20 | 8.07 | 134.01 | 0.93 | 91.43 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An abrasive article comprising a plurality of precisely shaped composites and a bonding medium wherein said precisely shaped composites comprise
   (a) a plurality of abrasive grits and
   (b) a polymeric binder, said binder formed by exposing a free radically polymerizable binder precursor to radiation energy,
   wherein said precisely shaped composites are bonded together by means of said bonding medium to form a shaped mass or wherein said precisely shaped composites are distibuted within a non-woven web and bonded to the web fibers by means of said bonding medium.

2. An abrasive article according to claim 1, wherein said abrasive grits are selected from the group consisting of fused aluminum oxide, ceramic aluminum oxide, heat treated aluminum oxide, silicon carbide, alumina zirconia, diamond, ceria, cubic boron nitride, garnet, and combinations thereof.

3. An abrasive article according to claim 1, wherein the size of said precisely shaped composites ranges from about 0.1 to about 2500 micrometers.

4. An abrasive article according to claim 1, wherein the size of said precisely shaped composites ranges from about 0.1 to about 500 micrometers.

5. An abrasive article according to claim 1, wherein said precisely shaped composites have shapes selected from the group consisting of pyramids, cones, prisms, spheres, and ellipsoids.

6. An abrasive article according to claim 1, wherein said precisely shaped composites are triangular-based pyramids.

7. An abrasive article according to claim 1, wherein said precisely shaped composites are quadrilateral-based pyramids.

8. An abrasive article according to claim 1, wherein said binder precursor is selected from the group consisting of acrylated urethane resins, acrylated epoxy resins, ethylenically unsaturated resins, aminoplast resins having pendant unsaturated carbonyl groups, isocyanurate derivatives having at least one pendant acrylate group and isocyanate derivatives having at least one pendant acrylate group.

9. An abrasive article according to claim 1, wherein said binder precursor further comprises a free radical initiator.

10. An abrasive article according to claim 1, wherein said precisely shaped composites further comprise at least one additive selected from the group consisting of fillers, grinding aids, fibers, antistatic agents, lubricants, wetting agents, surfactants, pigments, dyes, coupling agents, plasticizers, and suspending agents.

11. An abrasive article according to claim 1, wherein said precisely shaped composites comprise from 5 to 95% by weight abrasive grits and from 95 to 5% by weight binder.

12. An abrasive article according to claim 1, wherein said precisely shaped composites comprise from 20 to 75% by weight abrasive grits and from 80 to 25% by weight binder.

13. An abrasive article according to claim 1, wherein said bonding medium comprises a resinous adhesive.

14. An abrasive article according to claim 13, wherein said resinous adhesive is selected from the group consisting of phenolic resins, epoxy resins, urea-formaldehyde resins, acrylate resins, acrylated epoxy resins, acrylated urethane resins, aminoplast resins having pendant alpha, beta unsaturated carbonyl groups, maleimide resins, and urethane resins.

15. An abrasive article according to claim 1, further comprising individual abrasive grits.

* * * * *